United States Patent
Ochi et al.

(10) Patent No.: US 8,155,716 B2
(45) Date of Patent: Apr. 10, 2012

(54) PORTABLE RADIO DEVICE

(75) Inventors: Takahiro Ochi, Sendai (JP); Hiroaki Kobayashi, Sendai (JP); Haruhiko Kakitsu, Sendai (JP); Kouta Aoki, Yokohama (JP); Shigeaki Sakurazawa, Yokohama (JP)

(73) Assignee: Panasonic Corporation, Osaka (JP)

( * ) Notice: Subject to any disclaimer, the term of this patent is extended or adjusted under 35 U.S.C. 154(b) by 83 days.

(21) Appl. No.: 12/681,367

(22) PCT Filed: Sep. 30, 2008

(86) PCT No.: PCT/JP2008/002742
§ 371 (c)(1),
(2), (4) Date: Apr. 1, 2010

(87) PCT Pub. No.: WO2009/057246
PCT Pub. Date: May 7, 2009

(65) Prior Publication Data
US 2010/0216529 A1    Aug. 26, 2010

(30) Foreign Application Priority Data
Oct. 31, 2007   (JP) .................................. 2007-284174

(51) Int. Cl.
*H04M 1/00* (2006.01)

(52) U.S. Cl. ............... 455/575.3; 455/575.1; 455/575.7; 455/550.1; 455/566

(58) Field of Classification Search ............... 455/575.3, 455/575.1, 575.7, 550.1, 566
See application file for complete search history.

(56) References Cited

U.S. PATENT DOCUMENTS

| | | | | |
|---|---|---|---|---|
| 2005/0030233 A1* | 2/2005 | Kim et al. | | 343/702 |
| 2006/0094484 A1* | 5/2006 | Saito et al. | | 455/575.7 |
| 2007/0021159 A1* | 1/2007 | Kaneoya | | 455/575.3 |
| 2007/0123325 A1* | 5/2007 | Kim et al. | | 455/575.3 |
| 2008/0167093 A1 | 7/2008 | Nagano | | |

FOREIGN PATENT DOCUMENTS

| | | |
|---|---|---|
| JP | 2003-060759 A | 2/2003 |
| JP | 2004-165826 A | 6/2004 |
| JP | 3920196 B2 | 5/2007 |

OTHER PUBLICATIONS

International Search Report, mailed Oct. 28, 2008, issued in corresponding International Application No. PCT/JP2008/002742, filed Sep. 30, 2008.

* cited by examiner

*Primary Examiner* — Kwasi Karikari

(74) *Attorney, Agent, or Firm* — Seed IP Law Group PLLC

(57) ABSTRACT

A portable radio device of a type having two-direction openable and closable enclosures that can effectively lessen influence on an antenna exerted by a hinge section is provided. A horizontal hinge section 5 for rotatably joining an upper enclosure 1 to a hinge enclosure 3 around a first shaft center includes a horizontal hinge anchor 52 electrically connected to a first metal part 13 disposed in the upper enclosure 1, a horizontal hinge plate 53 that is placed in the hinge enclosure 3 and that contains a conductive material, and a first hinge shaft 51 that electrically connects the horizontal hinge anchor 52 to the horizontal hinge plate 53 and that contains a conductive material interposed between an area from a substantial center to an end of a long side of a face along which the upper enclosure 1 and the hinge enclosure 3 face a direction of second shaft center (X). An electrical path length of the lateral hinge section 5 including the lateral hinge plate 53 and the first hinge shaft 51 corresponds to a predetermined value that is not a substantially constant multiple of $\lambda/8$.

3 Claims, 6 Drawing Sheets

(A)

(B)

(A)

(B)

PORTABLE RADIO DEVICE

TECHNICAL FIELD

The present invention relates to a portable radio device in which two enclosures are joined together by means of hinges openable and closable in two directions including the vertical direction and the horizontal direction (i.e., the hinges capable of opening in horizontal and vertical directions) and, more particularly, to a portable radio device capable of effectively lessening influence on an antenna exerted by a hinge when the portable radio device is used while vertically opened.

BACKGROUND ART

A portable radio device, such as a portable phone, has recently become widespread, and various types of the portable radio device have already been proposed and developed (see; for instance, Patent Document 1).

More specifically, as shown in (A) of FIG. 7, upper and lower enclosures 101, 102 of a portable radio device 100 are joined together by means of a two-axis hinge (an unillustrated vertical hinge shaft and an unillustrated horizontal hinge shaft) provided on a support member 103. In particular, as shown in (B) of FIG. 7, the upper and lower enclosures 101, 102 are openable and closable, at an upper end side of the lower enclosure 102, in both planes B and C with reference to a horizontal hinge shaft 104A provided in a widthwise direction. Further, the upper and lower enclosures 101, 102 are rotatable around a vertical hinge shaft 104B provided in the lower enclosure 102 by way of the support member 103 provided at the center of an upper end side of the lower enclosure 102.

Aside from such portable radio device that is openable and closable in two axial directions (hereinafter called a "two-axis openable and closable type"), another type of a portable device having enclosures openable and closable in two directions; namely, vertical and horizontal directions (hereinafter called a "two-direction openable and closable type"), has already been proposed (see; for instance, Patent Document 2).

As shown in (A) of FIG. 8, a portable radio device 200 has an upper enclosure 201 and a lower enclosure 202; a first hinge shaft 203 that is attached to the upper enclosure 201 in such a state that the first hinge shaft can be locked with respect to the lower enclosure 202; and a second hinge shaft 204 that is attached to the lower enclosure 202 in a state in which the second hinge shaft can be locked with respect to the upper enclosure 201 and that is orthogonal to the first hinge shaft 203.

In the portable radio device 200 having such a configuration, a lock claw 203A provided on a part of the first hinge shaft 203 shown in (C) of FIG. 8 is pushed and locked in a lock hole 202A provided on a part of the lower enclosure 202 while the upper enclosure 201 and the lower enclosure 202 are completely closed as shown in (A) of FIG. 8, whereupon the upper enclosure 201 becomes openable and closable in a vertical direction (B) (vertically opening) [see (B) in FIG. 8]. In the portable radio device 200, a lock claw 201A provided on a part of the upper enclosure 201 shown in (B) of FIG. 8 is inserted and locked into a lock hole 204A provided on a part of the second hinge shaft 204, whereby the lower enclosure 202 becomes openable and closable in a horizontal (A) direction (able to horizontally open) [see (C) of FIG. 8].
Patent Document 1: JP-A-2004-165826
Patent Document 2: JP-A-2003-60759

DISCLOSURE OF THE INVENTION

Problem That The Invention Is To Solve

Incidentally, in the former two-axis openable and closable portable radio device 100, the length of the metallic vertical hinge shaft 104B provided on the upper enclosure 101 is nominal. For this reason, occurrence of an unwanted resonance frequency affecting a working frequency band is not observed. However, in the latter two-direction openable and closable portable radio device 200, it is also sufficiently conceivable that the length of the first metal hinge shaft 203 provided in the upper enclosure 201 is an electrical length that enables establishment of resonance with the wavelength of the working frequency band. Therefore, there is a case where influence on the antenna exerted by the hinge cannot be disregarded.

The present invention has been conceived in view of the circumstance and an object thereof is to provide a portable radio device of a type having enclosures openable and closable in two directions; namely, vertical and horizontal directions (hereinafter called a two-direction openable and closable type) that can lessen influence on an antenna exerted by a hinge.

Means for Solving the Problem

A portable radio device according to the present invention includes: a first enclosure; a first metal part provided in the first enclosure; a second enclosure; a circuit board provided in the second enclosure; an antenna element provided in the second enclosure; a feeding section for feeding power to the antenna element from the second circuit board; a third enclosure interposed between the first enclosure and the second enclosure; a first hinge section that rotatably joins the first enclosure to the third enclosure around a first shaft center; and a second hinge section that rotatably joins the second enclosure to the third enclosure around a second shaft center perpendicular to the first shaft center, wherein the first hinge section includes: a first retaining section that is disposed in the first enclosure and that contains a conductive material electrically connected to the first metal part; a second retaining section that is disposed opposite the antenna element in the third enclosure and that contains a conductive material; and a first hinge shaft that electrically connects the first retaining section to the second retaining section and that contains a conductive material disposed between an area from a substantially-center to an end of a long side of a face along which the first enclosure and the third enclosure face a direction of the second shaft center, and wherein an electrical path length of the first hinge section including the second retaining section and the first hinge shaft corresponds to a predetermined value that is not a substantially constant multiple of $\lambda/8$.

By means of the configuration, a portable radio device of a type having two-direction openable and closable enclosures, can effectively lessen influence on the antenna exerted by the hinge; particularly, by the first hinge.

The predetermined value is less than $\frac{1}{8}$ of a wavelength of a frequency at which the antenna element causes resonance.

Advantage of the Invention

According to the present invention, an electrical path length of the first hinge section including the second retaining section and the first hinge shaft corresponds to a predetermined value that is not substantially an constant multiple of λ/8. Hence, it becomes possible to lessen influence on an antenna exerted by the first hinge section. There can be provided portable radio device of a type having two-direction openable and closable enclosures that can effectively lessen influence on an antenna exerted by a hinge section; particularly, by a first hinge section.

DESCRIPTIONS OF THE REFERENCE NUMERALS AND SYMBOLS

1 UPPER ENCLOSURE (FIRST ENCLOSURE)
1A UPPER CLOSURE SURFACE
1B SIDE SURFACE
1B-1 SIDE SURFACE OPPOSING A HINGE ENCLOSURE
1C, 2B, 3A BEARING SECTION
13 FIRST METAL PART (PRINTED BOARD)
13A END
2 LOWER ENCLOSURE (SECOND ENCLOSURE)
2A LOWER CLOSURE SURFACE
23 PRINTED BOARD
24 FEEDING SECTION
25 ANTENNA ELEMENT
3 HINGE ENCLOSURE (THIRD ENCLOSURE)
3B SIDE SURFACE OPPOSING AN UPPER ENCLOSURE
4 VERTICAL HINGE SECTION (SECOND HINGE SECTION)
41 VERTICALLY-OPENING HINGE SHAFT (SECOND HINGE SHAFT)
5 HORIZONTAL HINGE SECTION (FIRST HINGE SECTION)
51 HORIZONTALLY-OPENING HINGE SHAFT (FIRST HINGE SHAFT)
52 HORIZONTAL HINGE ANCHOR (FIRST RETAINING SECTION)
53 HORIZONTAL HINGE PLATE (SECOND RETAINING SECTION)
A1 FIRST SHAFT CENTER
A2 SECOND SHAFT CENTER
X DIRECTION OF SECOND SHAFT CENTER
Y DIRECTION OF FIRST SHAFT CENTER

BEST MODE FOR IMPLEMENTING THE INVENTION

An embodiment of the present invention is hereunder described in detail by reference to the accompanying drawings.

Figure 1:
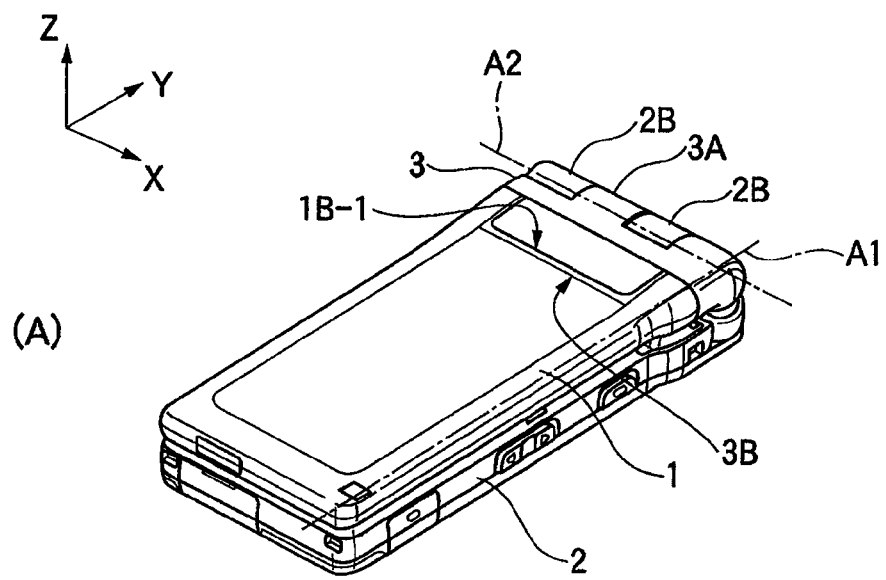
FIG. 1 illustrates a portable phone according to an embodiment of the present invention: (A) is a perspective view; and (B) is a plan view showing an upper closure surface of a lower enclosure from which an upper enclosure is removed.
Figure 1:
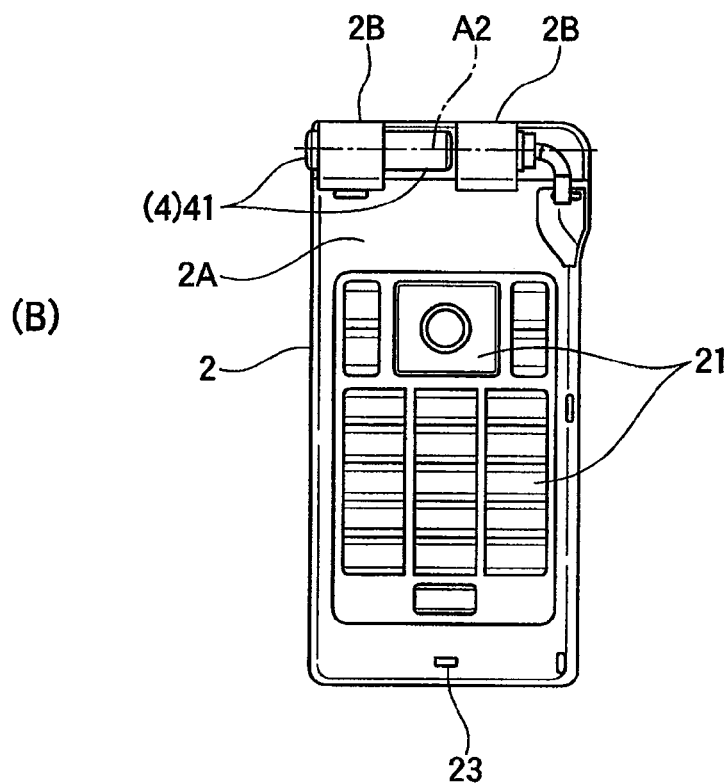

In FIG. 1, (A) and (B) show a portable phone that is one type of a portable radio device of the present invention. The portable phone has an upper enclosure 1 making up a first enclosure; a lower enclosure 2 making up a second enclosure; a third enclosure (hereinbelow called a "hinge enclosure 3") provided on the lower enclosure 2; a second hinge section 4 (hereinbelow called a "vertically-opening hinge") that joins the upper enclosure 1 to the lower enclosure 2 in such a way that the enclosures can rotate (vertically open) in a direction Y (a vertical direction) along a second shaft center A2 (see FIG. 2); and a first hinge section 5 (hereinbelow called a "horizontally-opening hinge") that joins the upper enclosure 1 to the lower enclosure 2 in such a way that the enclosures can rotate (horizontally open) in a direction X (a horizontal direction) along a first shaft center A1 orthogonal to the second shaft center A2 (see FIG. 3).

Figure 2:
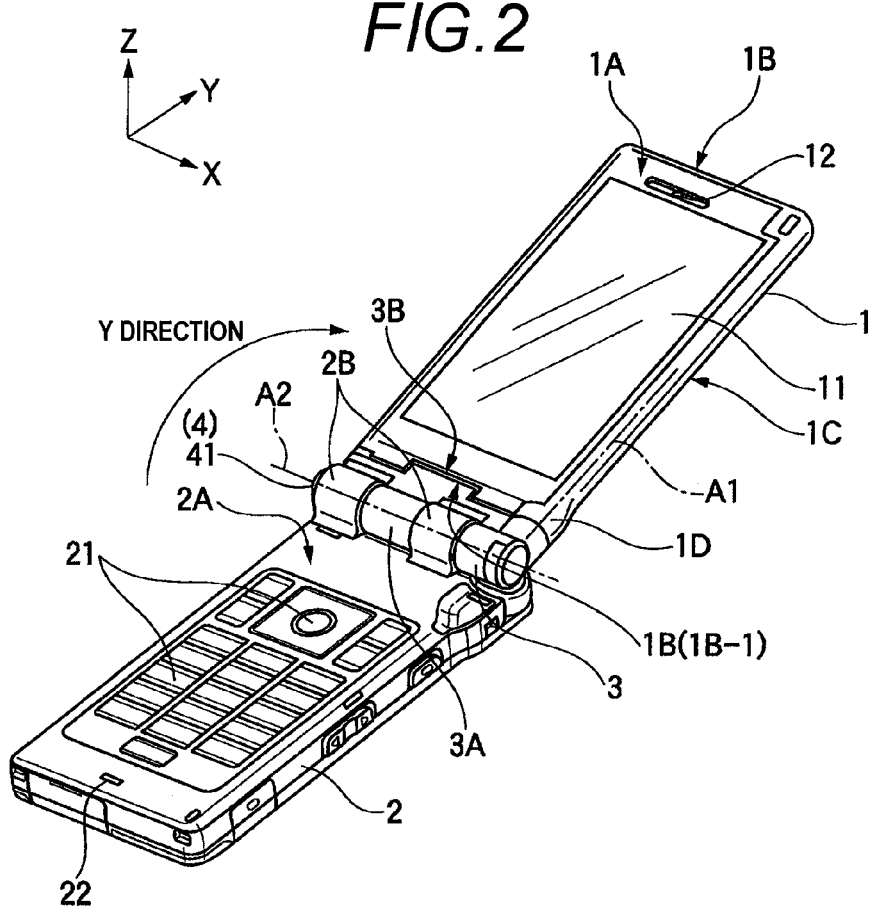
FIG. 2 is a perspective view showing a state of the portable phone according to the embodiment achieved when enclosures are vertically opened.

The upper enclosure 1 assumes the shape of a slim box having rectangular interior and exterior surfaces. In FIG. 2, a liquid crystal display section 11 and an earpiece section 12 are provided on the interior surface 1A (called namely an "upper closure surface") that fits to the lower enclosure 2 when closed. A printed board 13 (making up a "first metal part") is provided in the upper enclosure 1 shown in FIG. 4.

In the upper enclosure 1, a bearing section 1D for supporting one end of a first rotating shaft 51 to be described later is provided on one of two short side surfaces 1B of two types of side surfaces, including elongated side surfaces and short side surfaces (reference numeral 1B in FIG. 2 designates the short side surface, and 1C designates the long side surface); namely, on one end (or a position close to the one end) of a side surface 1B-1 (hereinbelow called a "side surface opposing the hinge enclosure") (see FIG. 2) that opposes the hinge enclosure 3 when the upper enclosure 1 is vertically opened.

The side surface 1B-1 opposing the hinge enclosure is a narrow, elongated, substantially-plane rectangular surface extending along the direction X that is a direction of the second shaft center. The direction of the second shaft center is aligned to the direction X parallel to the second shaft center A2 to be described later and orthogonal to a direction of the first shaft center parallel to the first shaft center A1 to be described later; namely, the direction Y.

Figure 3:
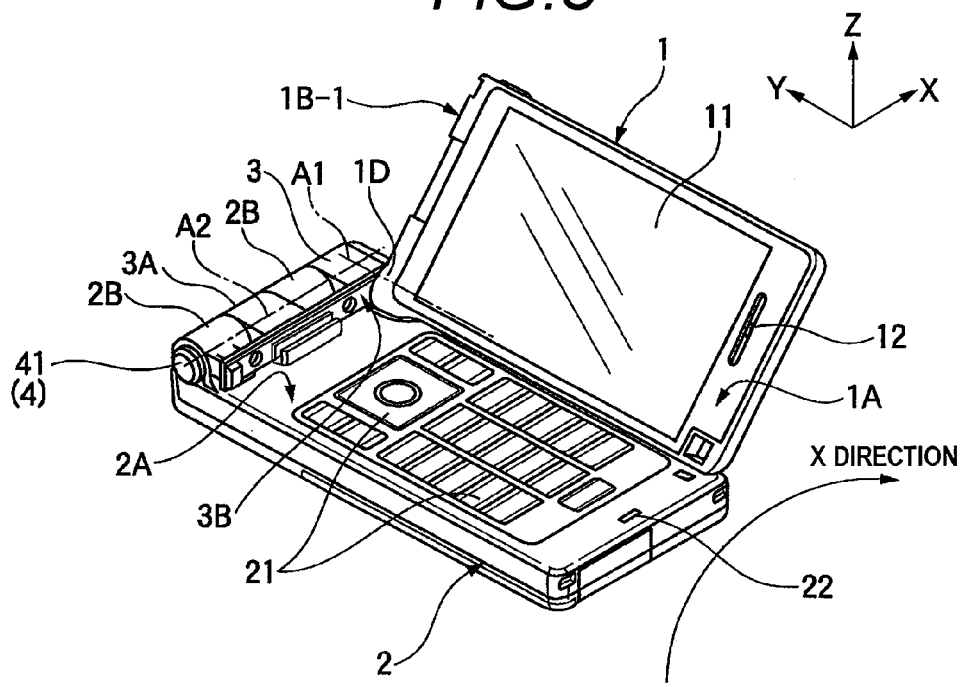
FIG. 3 is a perspective view showing a state of the portable phone of the embodiment achieved when enclosures are horizontally opened.

As shown in FIG. 3, the lower enclosure 2 assumes the shape of a slim box having rectangular interior and exterior surfaces as does the upper enclosure 1. An operation section 21 and a mouthpiece section 22 are provided on an interior surface 2A (hereinafter called a "lower closure surface") fitting to the upper enclosure 1 when the enclosure is closed. A printed board 23 that is a circuit board, a feeding section 24, and an antenna element 25 are provided in the lower enclosure 2 shown in FIG. 4. An 800 MHz band is used as the working frequency in the embodiment, and an inverted F antenna having an electric path length L of λ/4 is used for the antenna element 25 (where designates a wavelength achieved at a frequency "f"). The electric path length L of the antenna element 25 can also assume values of λ/8, 3λ/8, 5λ/8, . . . .

The hinge enclosure 3 is provided at one longitudinal end (an end in a direction +Y shown in FIG. 2) on the upper closure surface 2A of the lower enclosure 2. In order to attach a second rotatable rotating shaft (hereinafter called a "vertically-opening hinge shaft") 41 between the upper closure surface 2A and the lower enclosure 2; namely, the upper closure surface 2A and a substantially-cylindrical bearing section 2B provided on the lower enclosure 2 (see FIG. 2), a substantially-cylindrical bearing section 3A is provided on the hinge enclosure 3.

The first rotating shaft (hereinafter called a "horizontally-opening hinge shaft") 51 that rotatably joins the lower enclosure to the upper enclosure 1 is attached to the hinge enclosure 3.

The horizontally-opening hinge shaft 51 is interposed between the hinge enclosure 3 and the bearing section 1D provided at one end (or a position close to the end) of the side surface opposing the hinge enclosure 1B-1 of the upper enclosure 1. Specifically, when an explanation is given by reference to the hinge enclosure 3 in the state shown in FIG. 2, the horizontally-opening hinge shaft 51 is interposed between the upper enclosure 1 and the lower enclosure 2 at an end (or a position close to the end) of the side surface 3B facing the side surface 1B-1 opposing the hinge enclosure of the upper enclosure 1 (hereinafter called an "side surface opposing the upper enclosure") opposite to an end (a left end shown in FIG. 2) where the vertically-opening hinge shaft 41 is to be provided.

As shown in FIG. 2, the vertically-opening hinge 4 is for rotatably joining the upper enclosure 1 to the lower enclosure 2 in the vertical direction (Y) by way of the vertically-opening hinge shaft 41 (provided in the hinge enclosure 3), and substantially-columnar metal exhibiting required strength is used for the vertically-opening hinge shaft 41 of the embodiment.

Figure 4:
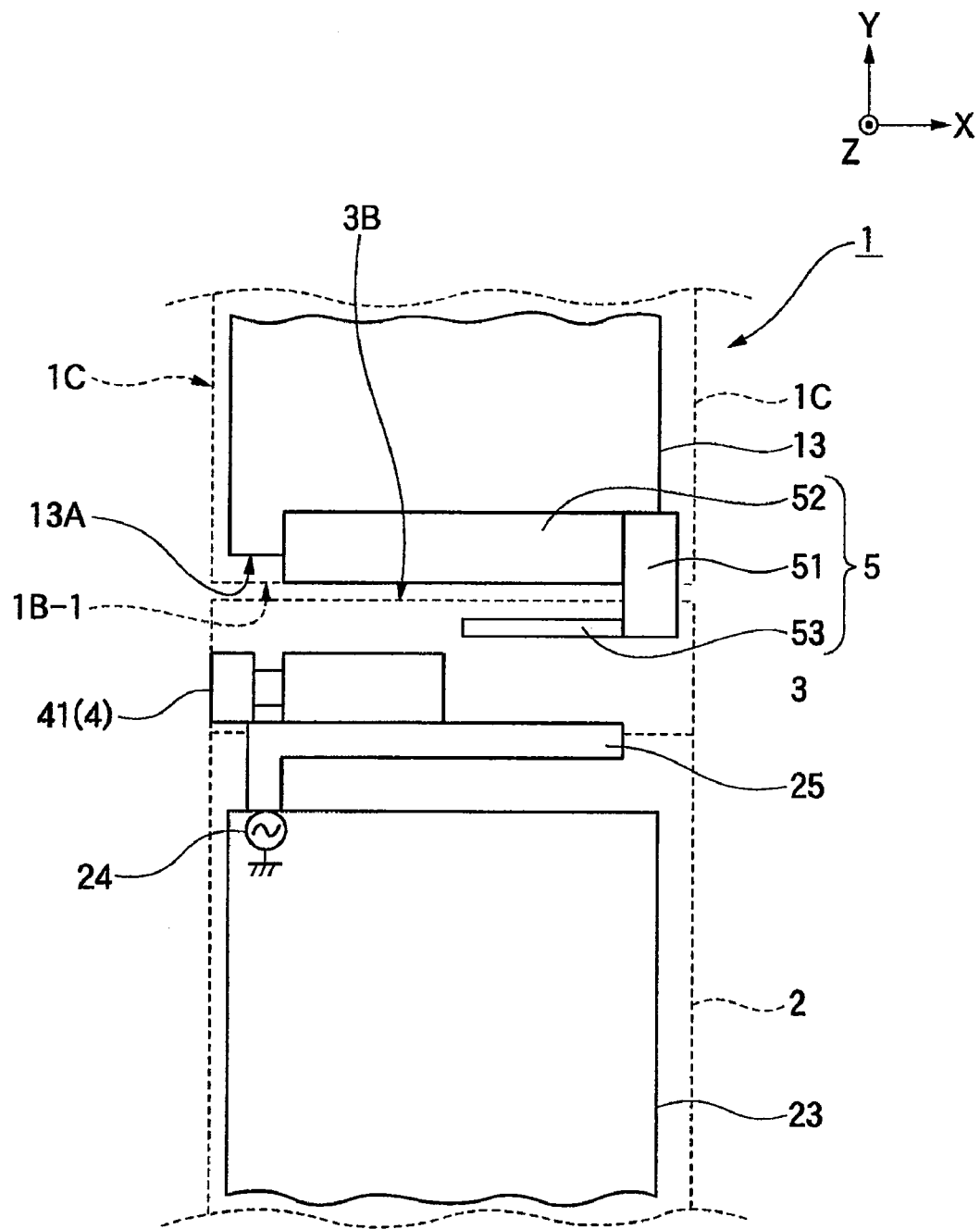
FIG. 4 is a descriptive view showing the configuration of a principal section achieved when the portable phone according to the embodiment of the present invention is vertically opened.

As shown in FIG. 2, the horizontally-opening hinge 5 is for rotatably joining the upper enclosure 1 to the lower enclosure 2 by way of the horizontally-opening hinge shaft 51 (see FIG. 1) (provided in the hinge enclosure 3) in the direction X (the horizontal direction) shown in FIG. 3. In FIG. 4, the horizontally-opening hinge section 5 has the horizontally-opening hinge shaft 51, a first retaining section (hereinafter called a "horizontal hinge anchor") 52 disposed in the upper enclosure 1, and a second retaining section (hereinafter called a "horizontal hinge plate") 53 disposed in the hinge enclosure 3.

The horizontal hinge anchor 52 (particularly, a projection from the end 13A of the printed board 13 in the direction −Y), the horizontally-opening hinge shaft 51 (a length achieved in the direction of the first shaft center A1; namely, direction Y), the horizontal hinge plate 53 (a length achieved in the direction X) are collectively referred to as "three metal parts" of the horizontal hinge section 5 shown in FIG. 4 that is a metal part having a potential to affect the antenna element 25. As will be described later, the three metal parts exhibit mutual electrical conductivity and are electrically connected to the printed board in the upper enclosure 1.

Figure 5:
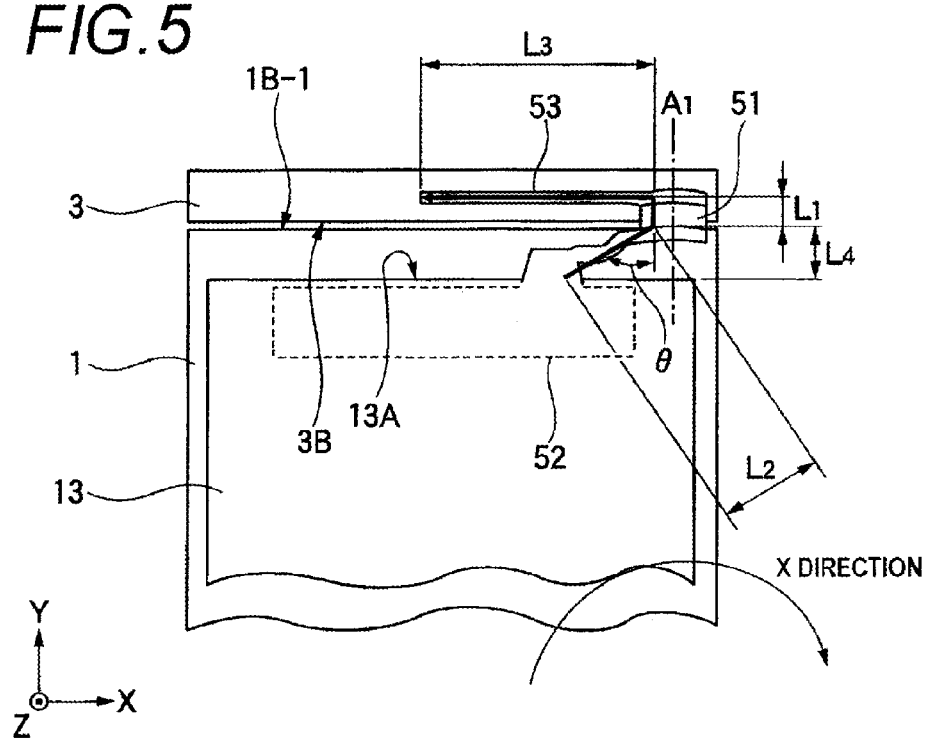
FIG. 5 is a descriptive view showing an electrical path length of the principal section of the portable phone according to the embodiment of the present invention including a horizontally-opening hinge shaft 51, a horizontal hinge anchor 52, and a horizontal hinge plate 53.
Figure 6:
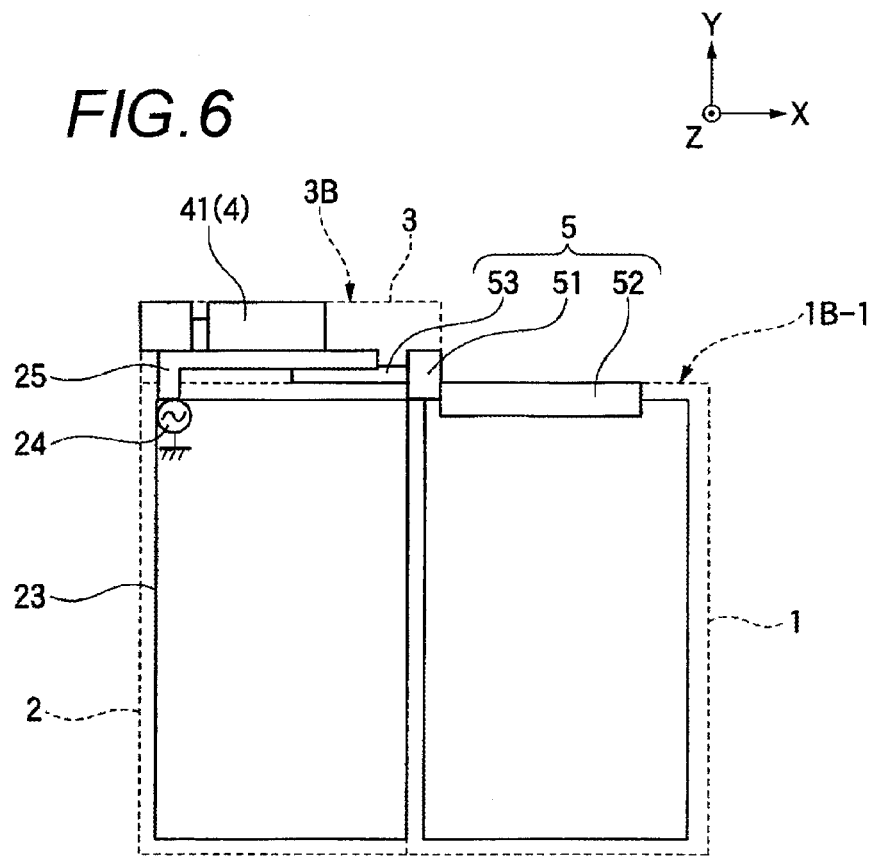
FIG. 6 is a descriptive view showing the configuration of the principal section achieved when the portable phone according to the embodiment of the invention is horizontally opened.
Figure 7:
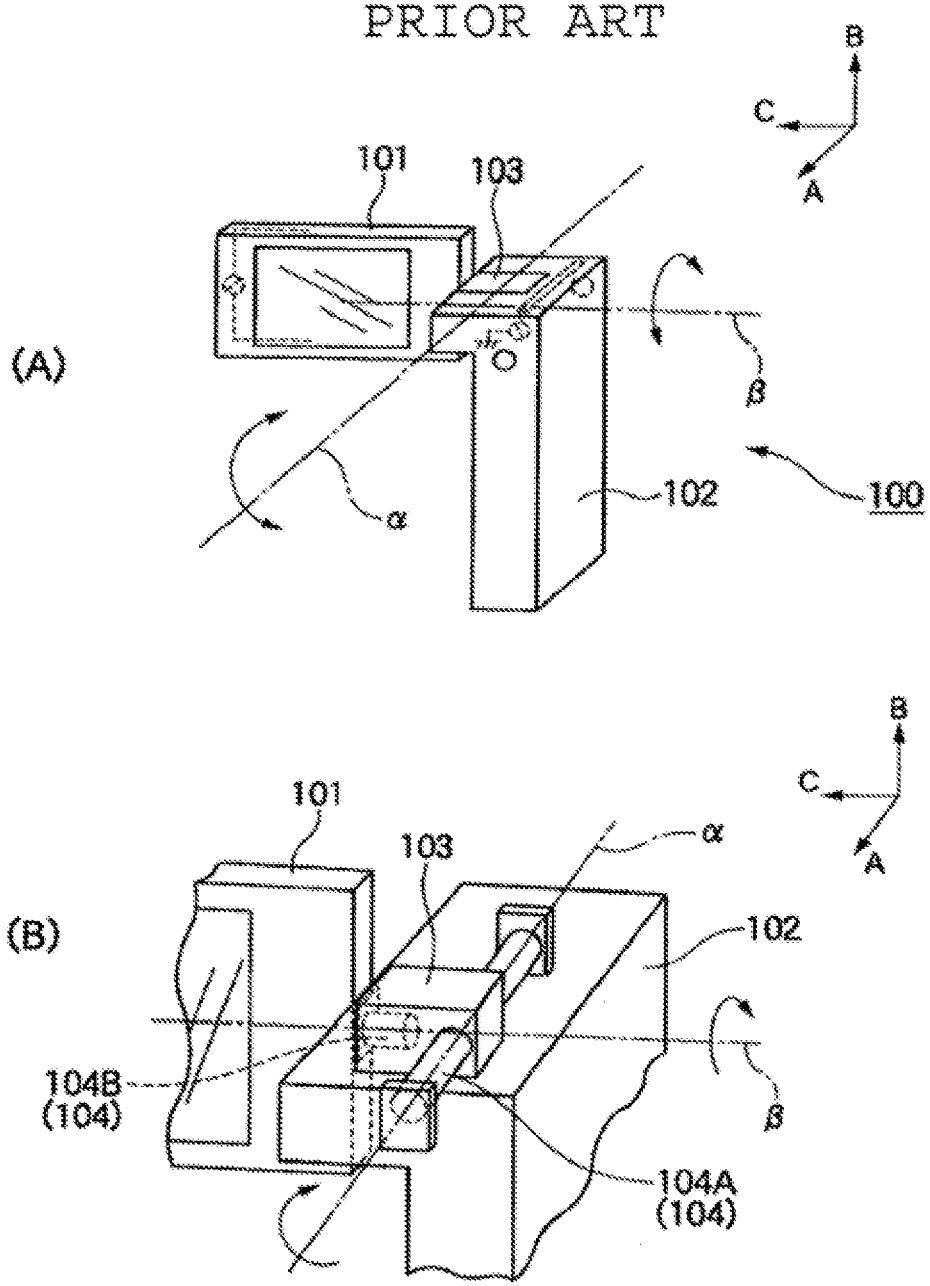
In FIG. 7, (A) is a perspective view showing related-art portable radio device having two-axis openable and closable enclosures, and (B) is a descriptive view showing the principal section of the portable radio device.
Figure 8:
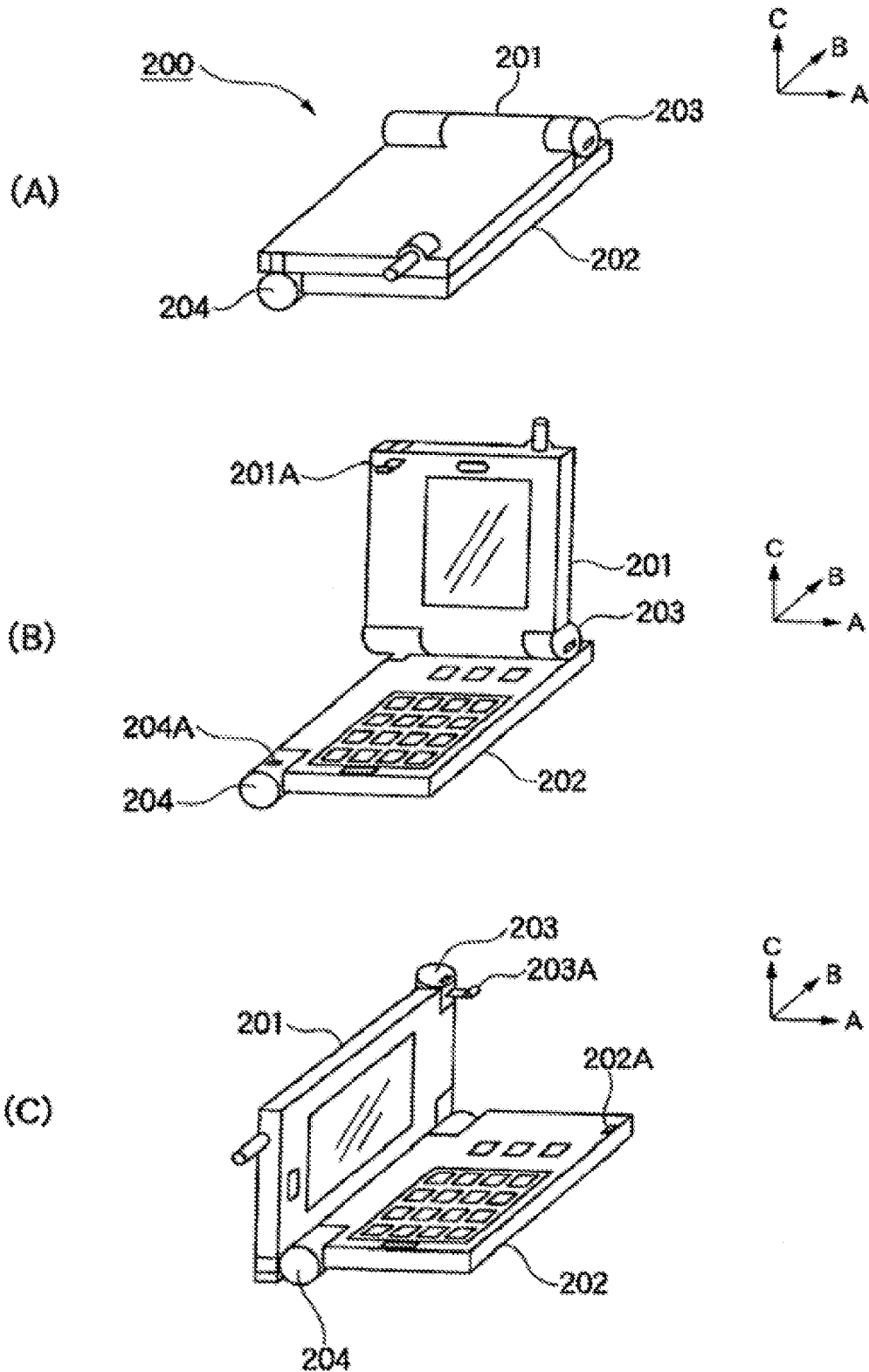
In FIG. 8, (A) to (C) are perspective views showing related-art portable radio device having two-direction openable and closable enclosures.

As shown in FIGS. 5 and 6, the horizontally-opening hinge shaft 51 is made of conductive metal exhibiting strength required to serve as the first shaft center A1 and interposed between the upper enclosure 1 and the hinge enclosure 3. The horizontally-opening hinge shaft 51 according to the embodiment is formed from a substantially-cylindrical hollow element having an electric path length $L_1$ in the direction Y. An unillustrated wiring cord [which can also be an FPC (Flexible Printed Circuit)] is inserted into the interior of the horizontally-opening hinge shaft 51, thereby establishing electrical conduction with the liquid crystal display section 11 and a power side of the lower enclosure 2.

In the meantime, the horizontal hinge anchor 52 is for stably holding the upper enclosure 1 when the upper enclosure 1 is rotated in the vertical direction (Y) with respect to the hinge enclosure 3 (the lower enclosure 2) (see FIG. 4) and when the upper enclosure 1 is rotated in the horizontal direction (X) with respect to the hinge enclosure 3 (the lower enclosure 2) (see FIG. 6). The horizontal hinge anchor 52 is disposed in the interior of the upper enclosure 1; is formed from metal exhibiting required strength; and is attached to the horizontally-opening hinge shaft 51.

In order to join the upper enclosure 1 to the hinge enclosure 3 (the lower enclosure 2) so as to rotate in the horizontal direction (X) around the horizontally-opening hinge shaft 51, the horizontal hinge anchor 52 is attached in a state of being rotatable with respect to the horizontally-opening hinge shaft 51. As mentioned previously, the horizontal hinge anchor 52 includes substantially-plate-shaped metal that includes a material exhibiting required strength and superior electrical conductivity and that is attached to the printed board 13.

Moreover, as shown in FIG. 5, the horizontal hinge anchor 52 projects out of the end 13A of the printed board 13 by an amount corresponding to the electrical path length $L_4$ in the direction Y toward the hinge enclosure 3. In fact, since the direction of projection of the horizontal hinge anchor 52 is inclined at an angle θ ($0 \leq \theta < \pi/4$) in the direction X, a physical, actual length of the horizontal hinge anchor 52 is $L_2 = L_4 / \cos \theta$.

As in the case with the horizontal hinge anchor 52, the horizontal hinge plate 53 is for stably holding the upper enclosure 1 when the upper enclosure 1 is rotated in the horizontal direction (X) with respect to the hinge enclosure 3 (the lower enclosure 2) and also for rotatably joining the upper enclosure 1 to the hinge enclosure 3 (the lower enclosure 2) in the horizontal direction (X). Therefore, in particular, the horizontal hinge plate 53 is disposed in the interior of the hinge enclosure 3 in a state of being rotatable with respect to the horizontally-opening hinge shaft 51 and concurrently opposing the antenna element 25 (see FIG. 4) in the present invention.

Moreover, the horizontal hinge plate 53 is formed into a substantially-elongated plate from metal that contains a superior conductive material and exhibits required strength. As shown in FIG. 5, the electric path length of the horizontal hinge plate 53 achieved in the direction X orthogonal to the direction Y is $L_3$. In particular, the horizontal hinge plate 53 of the present invention is formed while the dimension of the upper enclosure 1 achieved in the widthwise direction (X) is made as shortly as possible. As mentioned above, the horizontal hinge plate 53 has a length that is considerably shorter than the length of the horizontal hinge anchor 52. Since the horizontal hinge plate 53 is formed from an appropriate metal material exhibiting the required strength, the strength required to stably turn the upper enclosure 1 is assured.

In particular, in relation to the horizontal hinge section 5 of the present invention, in order to avoid occurrence of resonance with the adjacent antenna element 25, which will arise when the enclosures are vertically opened as shown in FIG. 2, a total value $L_o$ including an electric path length $L_2$ of a projection from the end 13A of the printed board 13 on the horizontal hinge anchor 52, the electric path length $L_1$ of the horizontally-opening hinge shaft 51 in the direction Y, and the electric path length $L_3$ of the horizontal hinge plate 53 in the direction X; namely, $L_1+L_2+L_3$, is arranged so as to come to a predetermined value that is not a substantially constant multiple of $\lambda/8$. In other words, the electric path length $L_1+L_2+L_3$ of the three metal parts is arranged so as to assume a predetermined value that is not a substantially constant multiple of $\lambda/8$.

In particular, in the present embodiment, the electric path length $L_0$ of the three metal parts is arranged so as to comes to a value that is less than ⅛ of the wavelength $\lambda$; namely, so as to fulfill the following expression.

$$L_0(..L_1+L_2+L_3)<\lambda/8 \quad (1)$$

Occurrence of resonance of the three metal parts with the antenna element 25 and generation of a current component of opposite phase are thereby prevented.

Meanwhile, when the portable phone according to the present embodiment is used while the upper enclosure 1 is vertically opened as shown in FIG. 2, an overall geometry of the three metal parts assumes the shape of the letter L inverted through 180° (in which the horizontal hinge anchor 52 makes up only a portion of the geometry in the direction Y) so as to become substantially point-symmetrical with respect to a substantially-L-shaped, unique layout of the antenna element 25, as shown in FIG. 4. However, in the present embodiment, the length of the horizontal hinge plate 53 is made short as mentioned previously, and the electric path length $L_0$ of the three metal parts is less than ⅛ of the wavelength $\lambda$ in the working frequency band of the antenna element 25. Hence, influence on the antenna element 25 can thereby effectively be lessened. Even a portable phone having the hinges that can open in both the vertical and horizontal directions can effectively prevent deterioration of the antenna characteristics.

A similar advantage is yielded even when the portable phone is used while the upper enclosure 1 is horizontally opened (and closed as well) as shown in FIG. 3. Specifically, the reason for this is that, even when the upper enclosure is horizontally opened (or closed), an electric current of opposite phase develops in the horizontal hinge plate 53 with respect to the antenna element 25. For instance, in FIG. 6, an antenna electric current flows from the feeding section 24 toward an open end of the antenna element 25 (in a direction from the left to the right). However, an electric current of opposite phase flows as a result of resonance of the horizontal hinge plate 53, the electric current flows in a direction from the first hinge shaft 51 toward the horizontal hinge plate 53 (from right to left). When the phenomenon is depicted by means of vectors, antenna performance is deteriorated as a result of (the antenna current)→being cancelled with (the current of opposite phase)←.

Accordingly, in the present embodiment, the length of the horizontal hinge plate 53 is made short as mentioned previously. Further, the electric path length $L_0$ of the three metal parts is less than ⅛ of the wavelength $\lambda$ achieved at the working frequency band of the antenna element 25. As in the case where the upper enclosure is vertically opened, the influence on the antenna element 25 can be effectively lessened. Thus, in the portable phone according to the present embodiment, antenna performance can be enhanced even when the upper enclosure is horizontally opened (or closed) as in the case of the upper enclosure being vertically opened.

The present invention is not limited to the embodiment at all and can be practiced in various modes without departing the gist of the invention.

For instance, in the present embodiment, the horizontally-opening hinge shaft 51 is interposed between the hinge enclosure 3 and the position close to the end opposite to the end where the vertically-opening hinge shaft 41 is disposed (the left end in FIG. 2), on the side surface 1B-1 opposing the hinge enclosure of the upper enclosure 1 integrated with the hinge enclosure 3 as shown in FIG. 2. When an explanation is given to the location "close to the end" where the vertically-opening hinge 41 is disposed in connection with the upper enclosure 1, the essential requirement for the location is to be an area existing between the "substantial center" and the "end" of at least the side surface opposing the hinge enclosure 1B-1 in its longitudinal direction (X) in; for instance, FIG. 2. The term "end" means the end (the right end in FIG. 2) opposite to the end (the left end in FIG. 2) where the vertically-opening hinge shaft 41 is disposed and where the portion of the hinge shaft projects.

The present invention has been explained in detail with reference to the particular embodiments. However, it is obvious for those skilled in the art that various variations and modifications can be applied without departing from the spirit and the scope of the present invention.

This application is based upon and claims the benefit of priority of Japanese Patent Application No. 2007-284174 filed on Oct. 31, 2007, the contents of which are incorporated herein by reference in its entirety.

INDUSTRIAL APPLICABILITY

A portable radio device of the present invention includes a first enclosure; a first metal part provided in the first enclosure; a second enclosure; a circuit board provided in the second enclosure; an antenna element provided in the second enclosure; a feeding section for feeding power to the antenna element from a second circuit board; a third enclosure interposed between the first enclosure and the second enclosure; a first hinge section that rotatably joins the first enclosure to the third enclosure around a first shaft center; and a second hinge section that rotatably joins the second enclosure to the third enclosure around a second shaft center perpendicular to the first shaft center, wherein the first hinge section includes a first retaining section that is disposed in the first enclosure and that contains a conductive material electrically connected to the first metal part; a second retaining section (a hinge plate) that is disposed opposite the antenna element in the third enclosure and that contains a conductive material; and a first hinge shaft that electrically connects the first retaining section to the second retaining section and that contains a conductive material disposed between an area from a substantially-center to an end of a long side of a face along which the first enclosure and the third enclosure face a direction of the second shaft center. Since an electrical path length of the first hinge section including the second retaining section and the first hinge shaft corresponds to a predetermined value that is a substantially constant multiple of $\lambda/8$. Thus, influence on the antenna exerted by the first hinge section can be prevented. There is yielded an advantage of the ability to lessen influence on the antenna exerted by the hinge section in relation to a type of portable radio device having two-direction openable and closable-type enclosures. The present invention is useful for a portable phone, a PHS (Personal Handyphone System), a PDA (Personal Digital Assistant), and the like, each of which has two-direction openable and closable enclosures.

The invention claimed is:
1. A portable radio device comprising:
a first enclosure;
a first printed circuit board provided in the first enclosure;
a second enclosure;
an antenna element provided in the second enclosure, and used at a predetermined frequency;

a second printed circuit board provided in the second enclosure, and feeding power to the antenna element;

a feeding section for feeding power to the antenna element from the second circuit board;

a third enclosure interposed between the first enclosure and the second enclosure;

a first hinge section that rotatably joins the first enclosure to the third enclosure around a first shaft center; and a second hinge section that rotatably joins the second enclosure to the third enclosure around a second shaft center perpendicular to the first shaft center, wherein the antenna element is disposed along the second shaft center, at a longitudinal end of the second enclosure in a vicinity of the second hinge section, the power is fed to the antenna element from a lateral end of the second enclosure opposing to an end in a vicinity of the first shaft center, the first hinge section includes, > a first retaining section that contains a conductive material electrically connected to the first printed circuit board, and is disposed in the first enclosure,
>
> a second retaining section that contains a conductive material, is disposed in the third enclosure and overlaps the antenna element when the second enclosure and the third enclosure are closed around the second shaft center, and
>
> a first hinge shaft that electrically connects the first retaining section to the second retaining section and contains a conductive material, and is disposed in an area between a substantial center of a plane along which the first enclosure and the third enclosure face to each other and an end of a long side of the plane, at least one of the first retaining section and the second retaining section being disposed along the second shaft center, and an electrical path length of the first hinge section which is a sum of an electrical path length of a portion, in the first retaining section, protruding from an end of the first circuit board, an electrical path length of the second retaining section, and an electrical path length of the first hinge shaft, corresponds to a value that is not a substantially natural number multiple of $\lambda/8$, $\lambda$ indicating a wavelength that corresponds to the frequency at which the antenna element is used.

2. The portable radio device according to claim 1, wherein the value of the electrical path length is less than ⅛ of the wavelength $\lambda$.

3. The portable radio device of according to claim 1, wherein at least a part of the first hinge section has a shape that is substantially point symmetrical with respect to a shape of the antenna element when the first enclosure is opened through rotation around the first hinge section.

* * * * *